Nov. 3, 1970   R. RINESCH ET AL   3,537,694
PLANT COMPRISING A STATIONARY, REFRACTORY-LINED REACTION VESSEL
Filed June 16, 1967

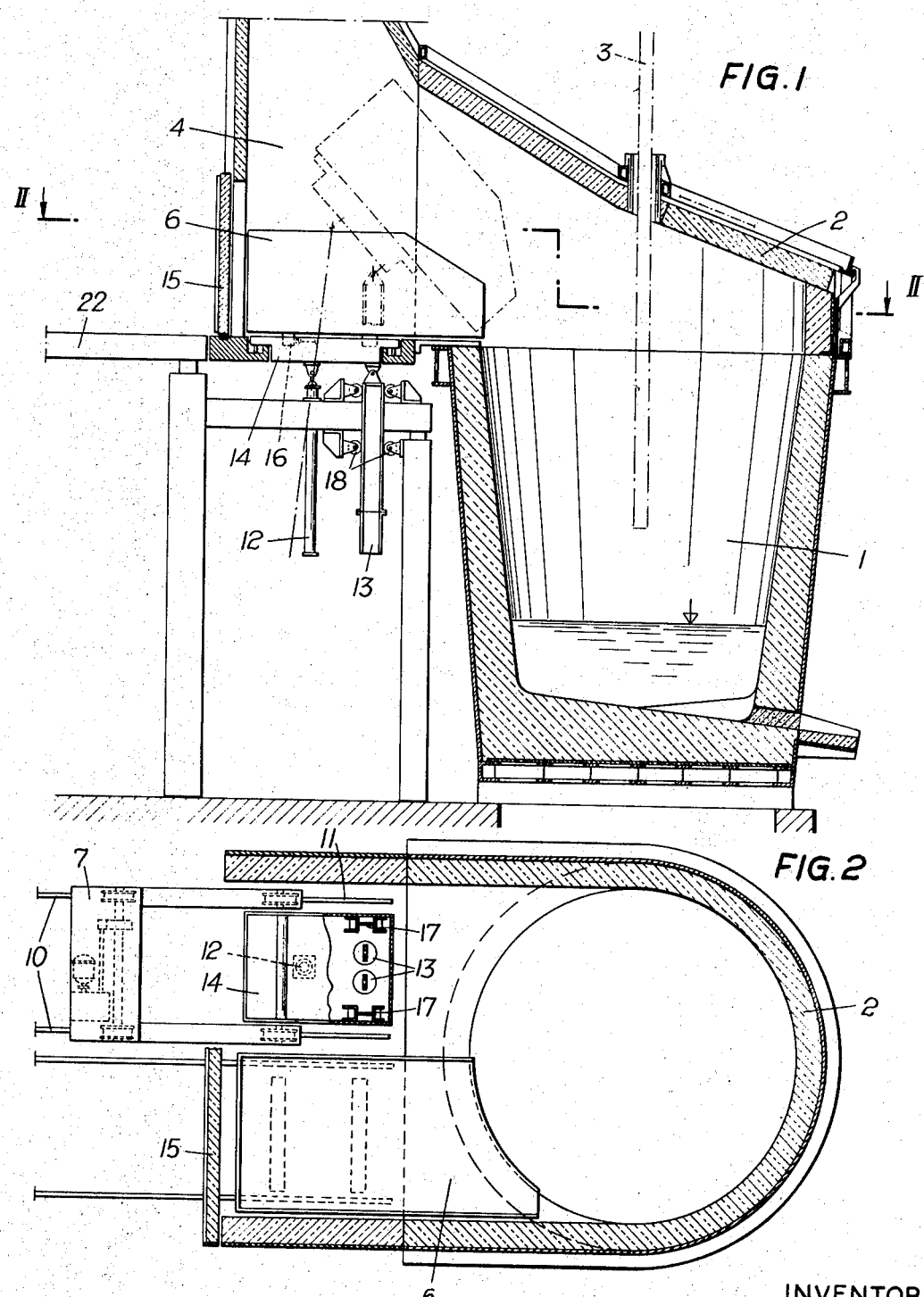

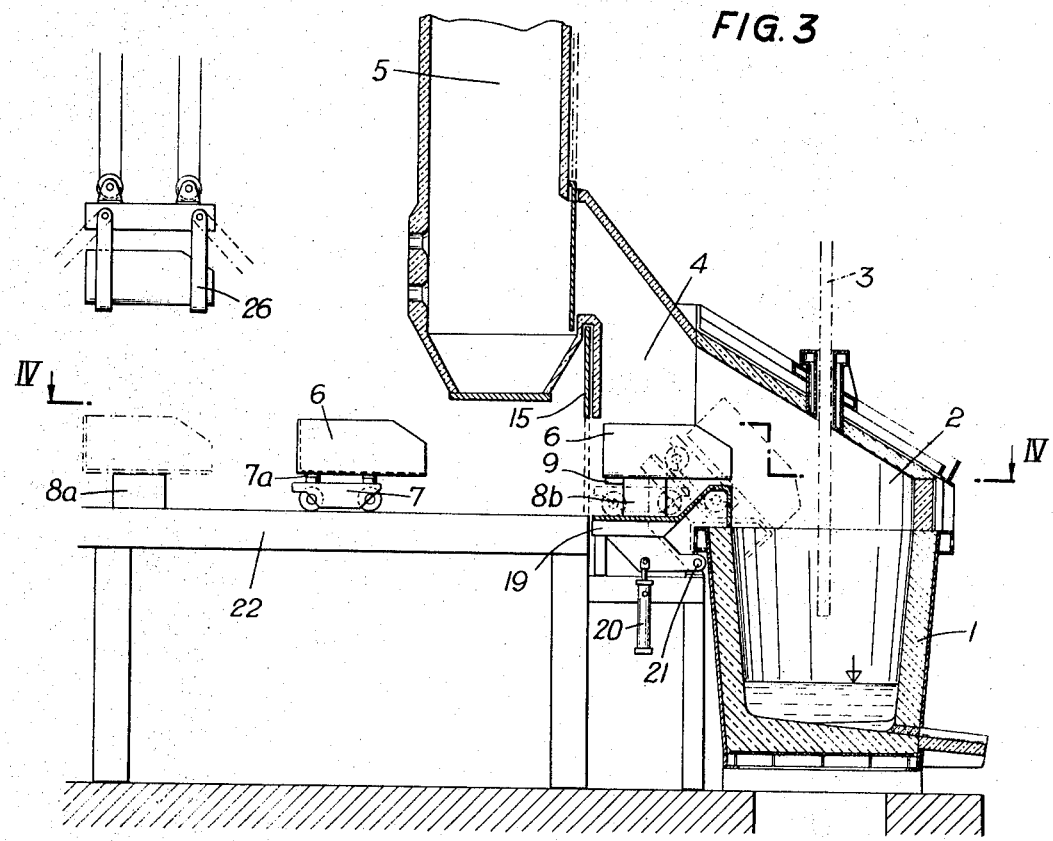
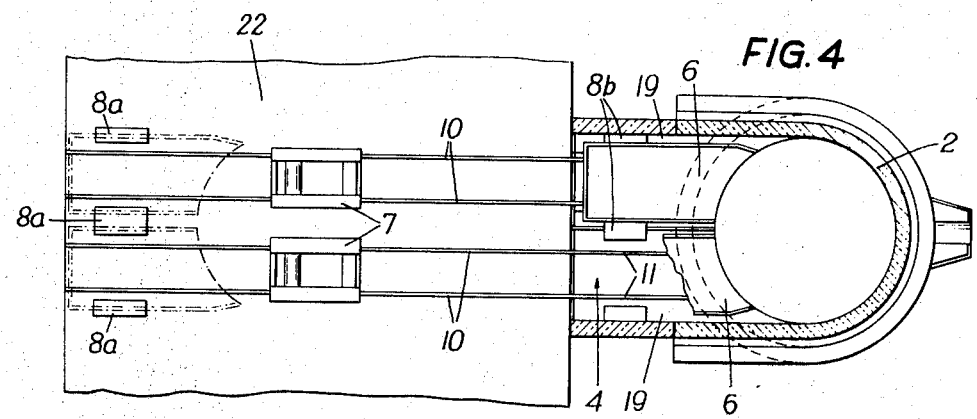

INVENTORS:
RUDOLF RINESCH
GERALD KASPAR
JOSEF LAMBRECHT
BY
THEIR ATTORNEYS

United States Patent Office 3,537,694
Patented Nov. 3, 1970

3,537,694
PLANT COMPRISING A STATIONARY, REFRACTORY-LINED REACTION VESSEL
Rudolf Rinesch and Gerald Kaspar, Linz, and Josef Lambrecht, Haid, Austria, assignors to Vereinigte Osterreichische Eisen- und Stahlwerke, Aktiengesellschaft, Linz, Austria, a company of Austria
Filed June 16, 1967, Ser. No. 646,685
Claims priority, application Austria, July 14, 1966,
A 6,757/66
Int. Cl. C21c 5/46
U.S. Cl. 266—13
6 Claims

ABSTRACT OF THE DISCLOSURE

The invention relates to a scrap charging and pre-heating chamber joined to the mouth of a stationary reaction vessel wherein the dimension of said chamber transversely of the direction of the flue gas stream is substantially equal to the diameter of the vessel mouth to enable quick pre-heating of large amounts of scrap using the flue gas stream for the pre-heating process. Rail tracks arranged in the scrap pre-heating chamber and adapted to adjoin corresponding tracks provided outside of said chamber enable quick delivery of scrap to said chamber, and tilting means arranged within the chamber enable quick feeding of the pre-heated scrap to the refining vessel.

---

Figure 5:
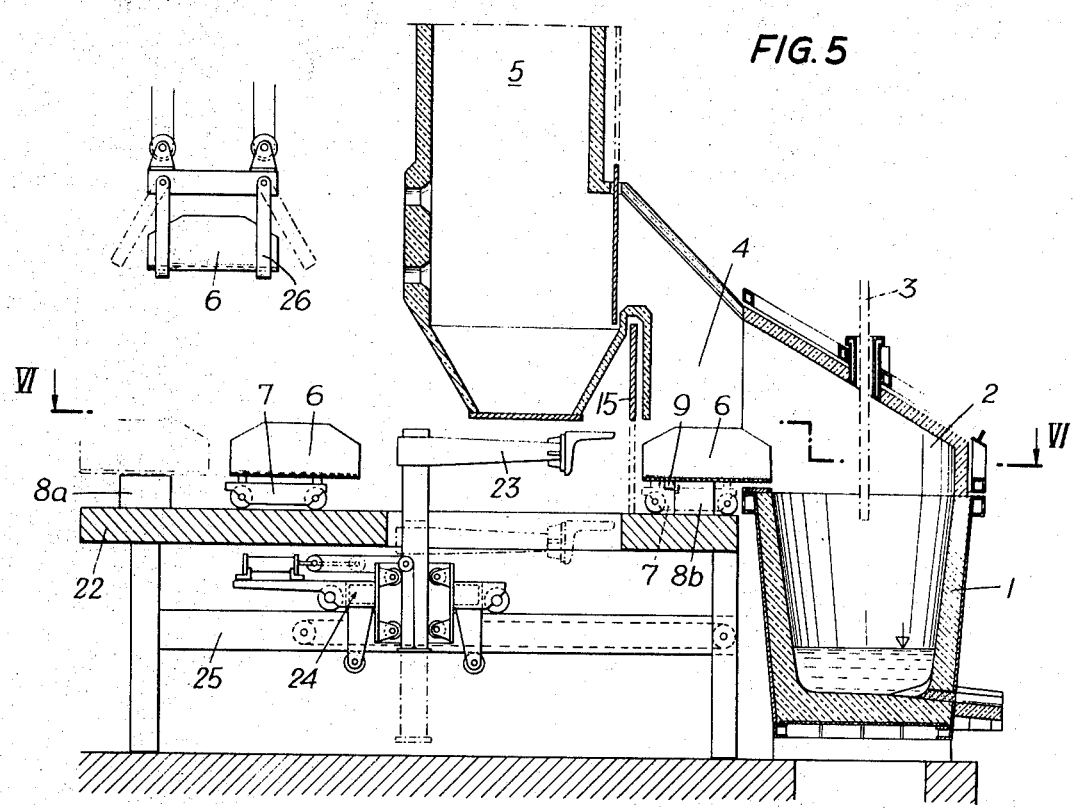

The copending patent application Ser. No. 579,574, now Pat. No. 3,452,971, granted July 1, 1969, and assigned to the present assignee, relates to a plant comprising a stationary, refractory-lined reaction vessel for converting solid and liquid charging materials, such as pig iron and scrap, into steel, said vessel comprising at least two horizontally displaceable parts adapted to be assembled to form the finished vessel, namely, one part taking up the liquid bath to be refined and providing a sufficiently large reaction space for carrying out an oxygen top-blowing process, and a hood part adjoining the stack when in the blowing position and having means for the introduction of charging materials, of one or several blowing lances, and of admixtures.

The copending application already demonstrates the possibility of arranging a scrap charging and pre-heating chamber adjoining, in the blowing position of the vessel, the scrap feed opening. Said chamber may be integral with the hood part, if desired, and a waste heat boiler or flue gas cooler may be arranged in back of it. The steel-making plant according to the copending application is particularly suited for large steel-making capacities of more than 300 metric tons, e.g. 500 metric tons as-tapped weight, whereby the problem arises that large amounts of scrap, such as 150 metric tons or more, have to be prepared, fed to the scrap pre-heating chamber and pre-heated during a heat, all in very short time. Further, it must be possible to feed pre-heated scrap into the refining vessel very quickly. Besides, there is the problem of keeping the velocity of the flue gas stream, which pre-heats the scrap, at a minimum, since at high gas stream velocities the heat cannot be exploited to the extent desired for pre-heating of the scrap; at high speeds of the flue gas, slag and steel would be swept along, which would cause problems in the sealing off against the outside atmosphere.

According to the present invention, which relates to a further development of the plant according to the copending application, the presented problems are solved by that dimension of the scrap charging and pre-heating chamber, which is transverse of the direction of the flue gas stream, being substantially equal to the mouth diameter of the reaction vessel. Preferably, the scrap pre-heating chamber accommodates two or more scrap trays arranged side by side.

To enable delivery of a charge to the scrap pre-heating chamber, the ends of one or several rail tracks are arranged in the scrap pre-heating chamber to adjoin corresponding tracks provided outside of the scrap pre-heating chamber, which tracks are traversable by tray transporting vehicles having lift-and lowerable tray holding means. Suitably, means for depositing and fastening the trays are arranged next to the rails in the pre-heating chamber.

The bottom of the pre-heating chamber may be tiltable together with the trays deposited thereon, or else the depositing means may be tiltable.

According to an embodiment, the depositing means forming part of the bottom of the pre-heating chamber may be so arranged as to be encircled by a U-shaped frame of a tray transporting vehicle, in which case the tray is removed from the transport vehicle by lifting said bottom part.

This and further characteristics of the invention are illustrated in the following description with reference to the drawings. FIG. 1 shows a vertical sectional view of a stationary refining plant comprising a scrap pre-heating chamber and a first embodiment of the scrap charging device. FIG. 2 shows a horizontal sectional view of the same plant along line II—II of FIG. 1. FIGS. 3, 4, 5, and 6 show two further embodiments of the scrap charging device, each in vertical and horizontal sectional view.

The stationary refining plant comprises the actual reaction vessel 1 with hood part 2. The blowing lance 3 for top-blowing pure oxygen onto the metal bath is inserted through this hood part. A scrap charging and pre-heating chamber 4 adjoins hood part 2, and a flue gas cooling and dust removing plant 5 is arranged in back of this chamber (FIGS. 3 and 5).

The scrap trays 6 are conveyable to the scrap pre-heating chamber 4 by means of tray transporting vehicles 7. This is carried out in the following manner: The scrap trays are lifted off side support 8a on the work platform by means of lifting cylinders 7a arranged on the tray transporting vehicle 7. Lowering of the trays upon suitable devices in the scrap pre-heating chamber, the design of which devices will later be described, is also effected by actuating these lifting cylinders arranged on the tray transporting vehicle.

The tray transporting vehicles 7 are rail-bound vehicles running on tracks 10 between the resting stands 8a and the scrap pre-heating chamber 4. In the embodiments of the charging device as shown in FIGS. 1, 2, 3, and 4, the rails are parted at the entrance to the scrap pre-heating chamber; in the embodiment according to FIGS. 5 and 6, they are continuous.

In the embodiment shown in FIGS. 1 and 2, the scrap trays 6 are moved along rails 10 by a U-shaped transporting vehicle 7 and conveyed to the scrap pre-heating chamber 4, which is fitted with rails 11. Part 14 of the bottom of the pre-heating chamber, the dimensions of which part are smaller than the area encompassed by the branches of the U-shaped frame of the tray transporting vehicle 7, is lifted by means of hydraulic lifting cylinders 12 and 13 to remove the tray from the vehicle. After the tray 6 has been removed, the tray transporting vehicle 7 returns to its initial position on work platform 22, and the door 15 is closed by lowering, in order to avoid entrance of secondary air into the scrap pre-heating chamber. At the same time, the receiving platform 14 forming part of the bottom of the scrap pre-heating chamber is lowered to the position shown in FIG. 1, i.e. back to floor-level of the scrap pre-heating chamber, by means of the above-mentioned hydraulic lifting cylinders 12 and 13. The lowered tray is secured by a locking device 16. The flue gases evolved during the refining process flow through the scrap in the scrap pre-heating chamber and pre-heat it. Charging of the pre-heated scrap can follow immediately upon tapping of the steel and slag. According to the embodiment of the scrap charging device shown in FIGS. 1 and 2, the tray 6 placed on the receiving platform 14 is rised by means of the hydraulic lifting cylinders 12 and 13. At first, both lifting cylinders raise the tray 6, cylinder 12 moving on after cylinder 13 has reached its top position. The receiving platform with the tray is thus tilted and scrap drops into the vessel. Suitably, two lifting cylinders 13 are arranged next to each other, as shown in FIG. 2. For accommodating lateral forces, guide rods 17 are arranged on both sides of the lifting cylinders 13, said guide rods being hingedly connected to the receiving platform 14 and guided by rollers 18. The lifting cylinders 12 and 13 are also connected with the receiving platform 14 by a joint.

In this manner, large batches of scrap can quickly and easily be fed to the stationary refining vessel. FIGS. 1 and 2 show the arrangement of two scrap trays in a scrap pre-heating chamber extending over the entire mouth opening of the refining vessel.

When the charging process is finished, scrap tray 6 and receiving platform 14 are tilted back again from the position shown in broken lines in FIG. 1 to an extent that, after opening of the door 15, the U-shaped tray transporting vehicle 7 can enter to receive the empty tray.

FIGS. 3 and 4 show another embodiment of the scrap charging device. This device consists essentially of a tray tilting means 19 which tilts scrap tray 6 with its supports 8b by means of a hydraulic cylinder 20 around fulcrum 21. Conveying of the scrap tray to the scrap pre-heating chamber and upon supports 8b is performed as above by means of a transporting vehicle 7, which in this case need not be U-shaped. The locking device 9 for securing tray 6 to the supports 8b is also similar to the above-mentioned one.

FIG. 4, which is a cross-sectional view of the plant shown in FIG. 3 along line IV—IV of FIG. 3, shows two tray tilting means 19, together forming the bottom of the scrap pre-heating chamber 4 and extending over the entire mouth opening of the refining vessel 1.

Charging of the scrap can also take place without pre-heating in such a way that, as shown in FIG. 3, the tray transporting vehicle 7 can be tilted simultaneously with tray 6 and supports 8b.

Figure 6:
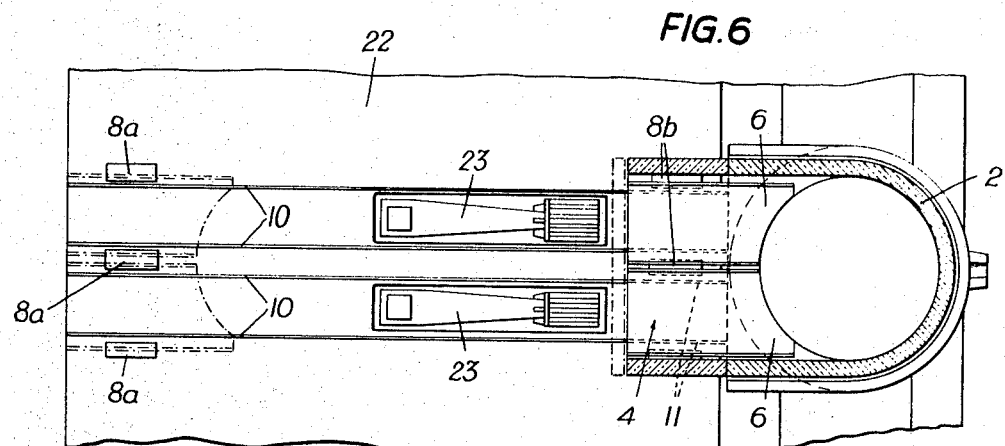

In FIGS. 5 and 6, the scrap pre-heating chamber 4 again covers the whole mouth opening of the refining vessel 1. In this third embodiment of the scrap charging device, trays 6 with open front and rear ends are conveyed into the pre-heating chamber by means of a tray transporting vehicle 7, deposited upon supports 8b and secured (at 9) as previously described. In this embodiment, the work platform 22 is adapted for the charging process in such a way that a lift- and lowerable ramming device 23 is brought into its working position through an opening in the work platform between rail tracks 10 (FIG. 5). This lift-and lowerable ramming device 23 is moved on carriers 25 by a suitable pusher means 24 towards the pre-heating chamber to push the scrap from the trays 6 into the refining vessel. According to FIG. 6, the scrap trays 6 with the pertinent lift- and lowerable ramming devices 23 are arranged in pairs.

The transfer of the scrap trays 6 to the work platform 22 may be effected by a crane having a suspension tackle 26 which is folded up after lowering the trays onto the side supports 8a arranged on the work platform.

What we claim is:

1. A plant comprising a bottom-tapped, refractory-lined reaction vessel for refining solid and liquid charging materials to produce steel, said reaction vessel comprising at least two horizontally displaceable parts adapted to be assembled in superposed relationship to form the finished vessel, said vessel being stationary and non-tiltable in the blowing position, a lower part being destined to receive the liquid bath to be refined and to provide a sufficiently large reaction space for carrying out an oxygen top-blowing process, and a top part having a mouth opening and constituting a hood part adjoining and conducting a stream of flue gases escaping during refining to a stack, when said plant is in assembled blowing position, and having means for the introduction of charging materials, of at least one blowing lance, and of admixtures, a scrap charging and pre-heating chamber being provided within the flow range of said flue gas stream, said scrap charging and pre-heating chamber having a dimension transversely of the direction of flow of said flue gas stream substantially corresponding to the mouth diameter of said reaction vessel.

2. A plant as set forth in claim 1 wherein said scrap pre-heating chamber accommodates at least two scrap trays arranged side by side.

3. A plant as set forth in claim 1 wherein said scrap pre-heating chamber accommodates at least two scrap trays arranged side by side and has a bottom, at least a portion of said bottom being tiltable together with at least one tray deposited thereon by hydraulic cylinders.

4. A plant as set forth in claim 1 wherein said scrap pre-heating chamber includes depositing means for at least one scrap tray, said depositing means forming a lift- and lowerable part of the bottom of said pre-heating chamber and being adapted to be encircled by a U-shaped frame of a tray transporting vehicle, said tray being removable from said vehicle by lifting said bottom part.

5. A plant as set forth in claim 1, wherein a ramming device is arranged between rail tracks extending into said scrap pre-heating chamber and adapted to be moved from below a work platform into a working position in said chamber to empty scrap trays with open front and rear ends conveyed into said chamber on rail vehicles.

6. A plant comprising a bottom-tapped, refractory-lined vessel for refining solid and liquid charging materials to produce steel, said reaction vessel comprising at least two horizontally displaceable parts adapted to be assembled in superposed relationship to form the finished vessel, said vessel being stationary and non-tiltable in the blowing position, a lower part being destined to receive the liquid bath to be refined and to provide a sufficiently large reaction space for carrying out an oxygen top-blowing process, and a top part having a mouth opening and constituting a hood part adjoining and conducting a stream of flue gases escaping during refining to a stack, when said plant is in assembled blowing position, and having means for the introduction of charging material, of at least one blowing lance, and of admixtures, a scrap charging and pre-heating chamber being provided within the flow range of said flue gas stream, said scrap charging and pre-heating chamber having a dimension transversely of the direction of flow of said flue gas stream substantially corresponding to the mouth diameter of said reaction vessel, said scrap pre-heating chamber being fitted with at least one rail track arranged to adjoin a corresponding rail track provided outside of said chamber, said rails being traversable by tray transporting vehicles having lift- and lowerable tray holding means, depositing and fastening means for at least one tray being arranged in said scrap pre-heating chamber next to said rails.

References Cited
UNITED STATES PATENTS

| | | | |
|---|---|---|---|
| 2,818,247 | 12/1957 | Francis | 266—35 |
| 3,093,252 | 6/1963 | McFeaters et al. | 266—13 |
| 3,304,072 | 2/1967 | Tkatch | 266—13 |
| 3,421,640 | 1/1969 | Falk | 214—18 |

J. SPENCER OVERHOLSER, Primary Examiner

J. S. BROWN, Assistant Examiner

U.S. Cl. X.R.

214—18; 266—35

PO-1050
(5/69)

UNITED STATES PATENT OFFICE
CERTIFICATE OF CORRECTION

Patent No. 3,537,694         Dated Nov. 3, 1970

Inventor(s) R. Rinesch et al

It is certified that error appears in the above-identified patent and that said Letters Patent are hereby corrected as shown below:

Col. 3, line 24, "rised" should read --raised--;
Col. 4, line 67, "material" should be --materials--; and
Col. 5, line 10, "3,093,252" should be --3,093,253--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents